Oct. 11, 1949.  E. B. MEAD  2,484,236
POULTRY PICKER WITH VARIABLE LENGTH FINGERS
Filed Dec. 14, 1945  2 Sheets-Sheet 1
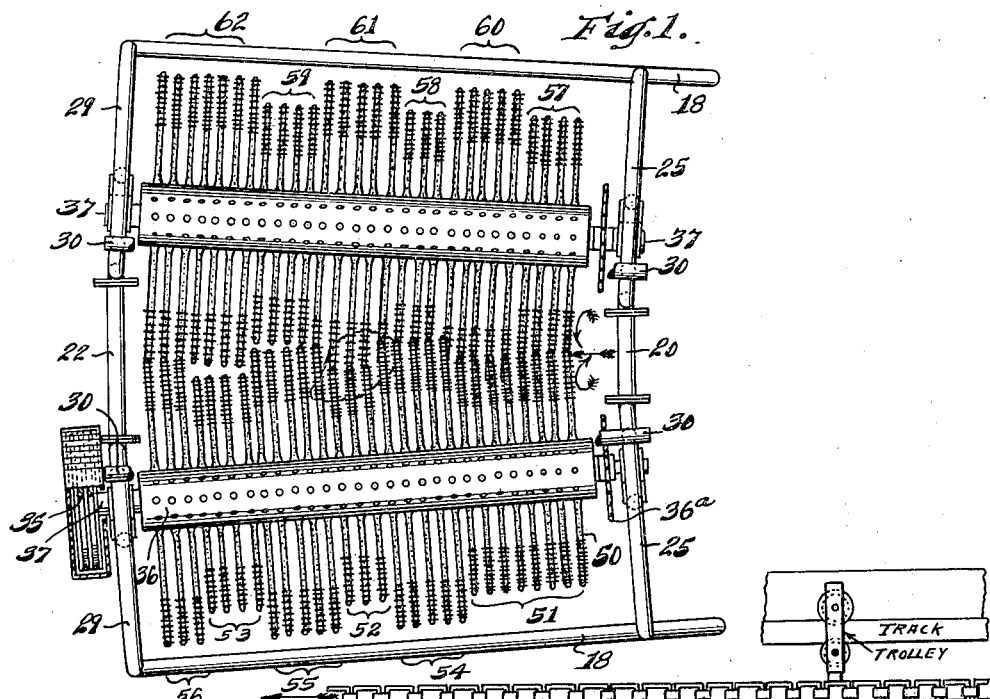
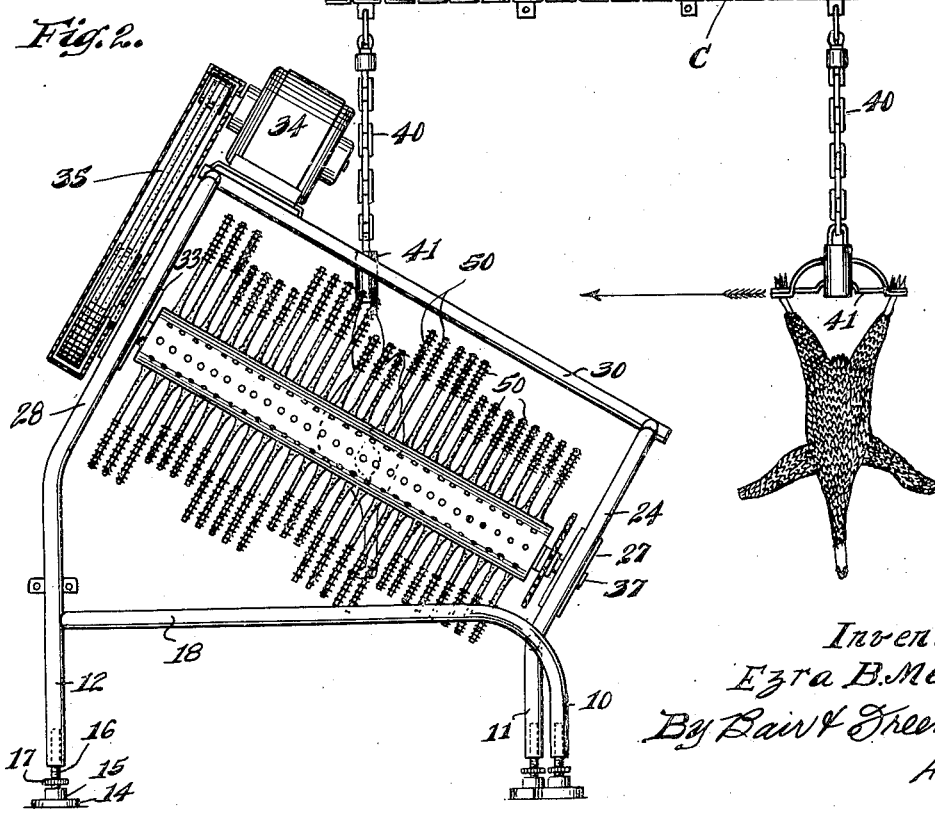
Inventor:
Ezra B. Mead.
By Bair & Freeman
Atty's.

Oct. 11, 1949.  E. B. MEAD  2,484,236
POULTRY PICKER WITH VARIABLE LENGTH FINGERS
Filed Dec. 14, 1945  2 Sheets-Sheet 2
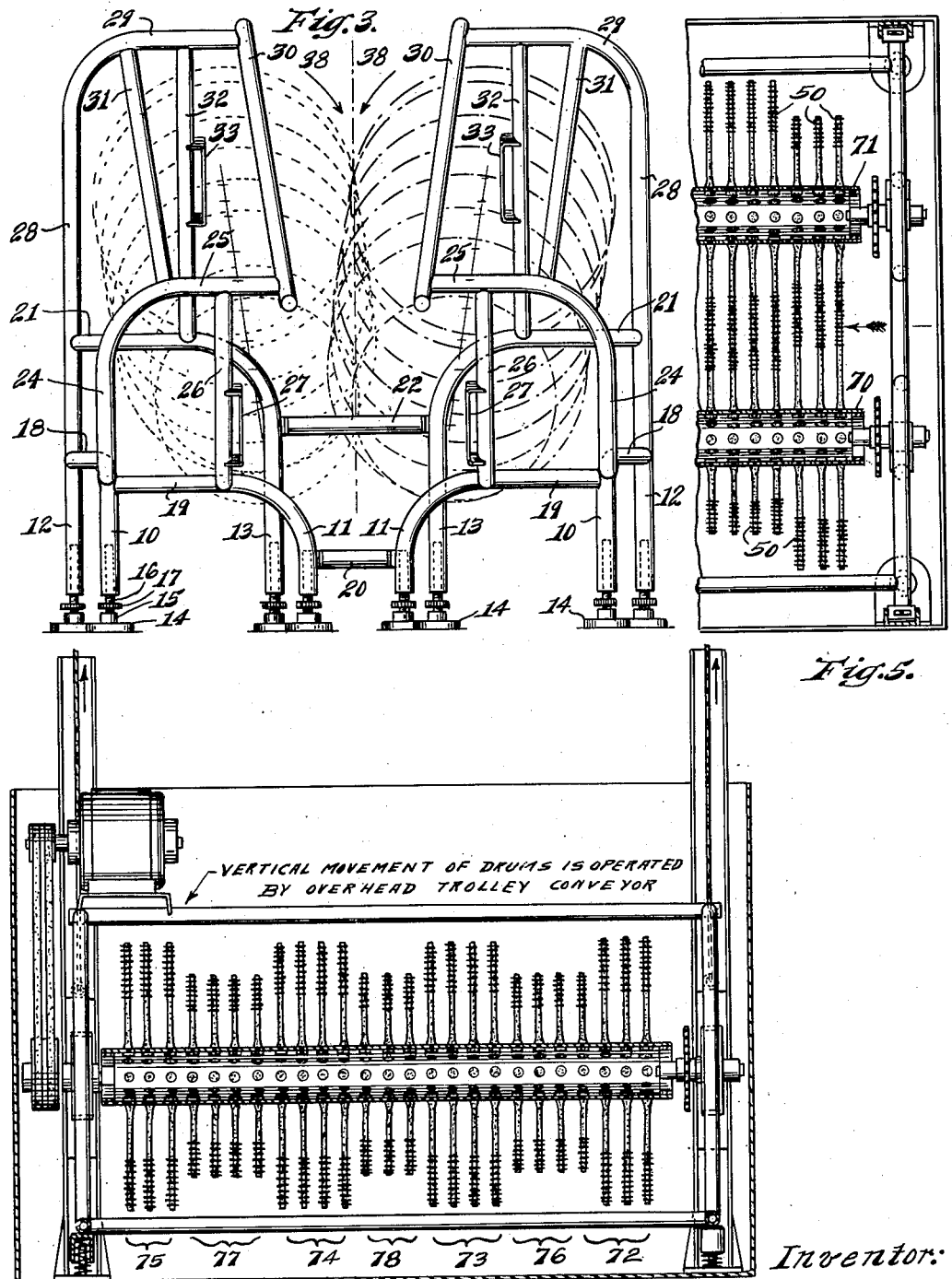
Inventor:
Ezra B. Mead.
By Bair & Freeman
Attys.

Patented Oct. 11, 1949

2,484,236

UNITED STATES PATENT OFFICE 2,484,236

POULTRY PICKER WITH VARIABLE LENGTH FINGERS

Ezra B. Mead, Ottumwa, Iowa, assignor to Barker Poultry Equipment Co., Ottumwa, Iowa, a corporation of Iowa Application December 14, 1945, Serial No. 634,963

6 Claims. (Cl. 17—11.1)

My invention relates to poultry pickers of the type having a drum with fingers of resilient material, such, for example, as rubber.

It is my purpose to provide such a picker having fingers of different lengths on different sections of the drums, whereby a variety of advantages in picking poultry are achieved.

Another object is to provide such a picker in which a pair of non-parallel drums are arranged adjacent each other for picking poultry between the drums.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a plan view of a picker embodying my invention in which the drums are inclined with relation to each other and with relation to the horizontal.

Figure 2 is a side elevation of the same, showing also a portion of the conveyor by which the birds are handled for the picking operation.

Figure 3 is a front elevation of the picker of Figure 1.

Figure 4 is a side elevation of a slightly modified form in which two parallel drums are arranged horizontally.

Figure 5 is a plan view of one end of the picker of Figure 4.

It is now common practice in the industry to pick poultry by subjecting the birds to the action of resilient, somewhat flexible, fingers, arranged on a drum. In the larger plants, the bird is passed between two drums.

I have found, when the birds are picked between two picker drums of the general type under consideration, if the fingers on different sections of each drum are made of different lengths and some of the fingers of one length on one drum are staggered with relation to fingers of similar length on the other drum, and the birds and drums have relative movement lengthwise of the drums, the birds are turned or rotated somewhat during the picking. As a result, the machine does a better job of picking, particularly on the wing, tail and neck feathers and on the feathers under the wings and between the legs and the body, than can be accomplished with fingers of uniform length.

I have also found that the picking is still further improved by inclining the drums with relation to each other and with relation to the horizontal.

If the birds are hung head down and first subjected to the fingers at the lower ends of the drum, the neck feathers can be independently picked before the body reaches the picker, where the picker begins to operate on them. Also the birds as they travel between the drums, are oscillated between the fingers of different lengths so they tend to swing slightly from one side to the other. This I have found gives better picking results.

In the drawings, in Figures 1, 2 and 3, I have shown a pair of drums mounted on suitable frame members and inclined from the horizontal and slightly inclined with relation to each other. I shall first describe the frame structure on which the drums are mounted.

For each drum there are two front legs 10 and 11, preferably made of pipe. Likewise for each drum there are two rear legs 12 and 13, likewise preferably made of pipe. Below each leg is a base 14 with a socket 15, shown, for instance, in Figure 3 in which is rotatably mounted an upright post 16 having an annular flange 17 adapted to be gripped by a wrench. The upper end of each post 16 is threaded into the lower end of one of the legs. Thus by adjustment of the post 16 a limited degree of adjustment of the frame can be effected. Connected, as by welding, to each leg 12 at a point above its lower end is a forwardly-extending frame member 18, preferably a pipe, which may be connected integrally or otherwise with a leg 10, as shown in Figure 2.

Each leg 10 at the front of the picker is connected as by welding to a transverse frame member 19, which extends to and is rigidly connected with a leg 11 integrally or otherwise. The legs 11 may be rigidly connected by a transverse frame member 20 arranged low enough so that it will not interfere with the travel of the birds.

At the rear of the picker a transverse frame member 21 is secured by welding or otherwise to each leg 12 and is integrally or otherwise rigidly secured to a leg 13. Legs 13 may be connected at the rear of the machine by transverse frame member 22.

I refer to the front of the picker as the end from which the birds approach.

At the front of the picker the frame member 24 is integrally or rigidly connected with each leg 10 and inclined upwardly and forwardly as shown in Figure 2, and has at its upper part a section or portion 25 extending inwardly as shown in Figure 3. Each section 25 is rigidly connected with a member 19 by means of a frame member 26.

The upper parts of the legs 12 have portions 28 inclined forwardly and terminating in portions 29 inclined, horizontally inwardly. The ends of the frame portions 29 and 25 are connected by inclined frame members 30. Members 25 and 29 are also connected by fore and aft frame members 31. At the rear of the machine, the frame member portions 29 and 21 are connected by frame members 32. On the frame members 26 and 32 are brackets 27 and 33 for supporting the bearings for the stub shafts 37 at the ends of the picker drums.

The pipes 30 may be connected with a water supply and provided with holes or nozzles to spray the birds as they pass the picker.

Each picker drum 36 comprises a hollow cylinder or the like on which the picking fingers are mounted. Each drum 36 has stub shafts 37 at its ends supported by suitable bearings, not shown in detail, on respective brackets 27 and 33. The drums may be rotated from motors 34, one only of which is shown in Figure 2, suitably mounted on the frames, by means of gearing 35 of any desired kind. A gearing 35 connects each of the drums with its motor, to rotate the drums in opposite directions, indicated by the arrows 38 in the upper part of Figure 3. Since this gearing does not in itself form a part of my invention, it is shown diagrammatically, and for one drum only.

The members 36a are throw rings for throwing water centrifugally and preventing the water from running down into the bearings.

The birds are carried to the picker by means of an endless conveyor indicated generally at C from which hang chains 40 on which are shackles 41 of conventional construction.

Picker fingers

Picker fingers 50 may be of rubber or other suitable material, having the desired resilience and flexibility. On each drum I preferably use fingers varying in length. For example, referring to the lower drum shown in Figure 1, I have shown certain sections 51, 52 and 53, having fingers of certain length and other sections 54, 55 and 56 provided with longer fingers. Similarly on the drum at the upper part of Figure 1 I have shown certain sections 57, 58 and 59 provided with fingers of certain length which, as here illustrated, are similar to the fingers of sections of 51, 52 and 53. Also on the upper drum the sections 60, 61 and 62 are provided with longer fingers corresponding to those as shown at 54, 55 and 56.

At the lower front ends of the drums it will be noted that short fingers are first used. At the upper rear end of each drum I provide long fingers. Thus, at the front end of the drum a short section is equipped with short fingers, and at the rear end of the drum, a short section is equipped with long fingers. Otherwise the short fingers on one drum are staggered with the long fingers on the other drum.

Operation

The birds carried by shackles on the conveyor are advanced as illustrated by the arrow in Figure 2 to the lower front end of the picker, and the necks and shoulders are first picked by the short fingers of sections 51 and 57.

In automatic machines difficulty is encountered in removing the longer feathers from the wings and tail, removing the feathers under the wings and between the legs and body, and in removing the neck feathers. In the structure here shown the necks of the birds are first picked by the short fingers in the ends of the drums that are closest together. When the birds begin to reach the long fingers of one drum, which are opposite short fingers of another drum, and throughout their further progress until they nearly reach the rear end of the picker, I find that the arrangement of variable length fingers tends to give the birds a slight alternating rotary motion and this achieves a cleaner picking. I also find that the birds are slightly rocked sidewise and swing a little out of vertical position back and forth, and this also gives a better result particularly in removing those feathers hardest to pick.

In Figures 4 and 5 I have shown a slightly modified form of drum. A pair of drums 70, 71 is arranged with the drums in parallel horizontal position. It is contemplated that these drums will be raised and lowered as illustrated, for instance, in the Barker Patent No. 2,328,770, dated September 7, 1943. Each drum of the modified form has different sections equipped with fingers of varying length as illustrated in Figure 4 where sections 72, 73, 74 and 75 have longer fingers, while sections 76, 77 and 78 have shorter fingers.

The long fingers of one drum are arranged opposite the short fingers of the other drum.

It will be understood that the drums of the modified fingers of Figs. 4 and 5 will be raised and lowered and at the same time the birds are being advanced by a conveyor in the picking operation. The same alternating rotary motion and sidewise swinging motion mentioned above are achieved.

It is obvious that changes may be made in the details of the structure of my improved picker whereby fingers may be made of different lengths, shapes and sizes, but by using fingers of varying lengths, particularly by staggering fingers of the same length on the respective drums, the desirable results herein described are accomplished.

I claim as my invention:

1. In a poultry picker, a pair of picker drums, means for supporting the drums adjacent each other so that birds may be passed between the drums for picking, said drums being inclined with relation to each other and having resilient picking fingers, the fingers on certain sections of each drum being shorter than the fingers on other sections, certain of the long fingers on one drum being opposite to certain short fingers on the other drum, said supporting means having relative vertical adjustment for the respective drums.

2. In a poultry picker, a pair of rotatable juxtaposed drums, each having radially arranged resilient fingers, the fingers on each drum being grouped in sections axially of the drum, the sections in each drum being made up alternately of long and short fingers.

3. In a poultry picker, a pair of rotatable juxtaposed drums, each having radially arranged resilient fingers, the fingers on each drum being grouped in sections axially of the drum, the sections in each drum being made up alternately of long and short fingers, certain of said fingers of each length on each drum being staggered axially of the drum with respect to the fingers of the same length on the other drum.

4. In a poultry picker, a pair of rotatable juxtaposed drums, each having radially arranged resilient fingers, said drums being inclined from horizontal and with relation to each other, the fingers on each drum being grouped in sections axially of the drum, the sections in each drum being made up alternately of long and short fingers.

5. In a poultry picker, a pair of rotatable juxtaposed drums, each having radially arranged resilient fingers, said drums being inclined from horizontal and with relation to each other, the fingers on each drum being grouped in sections axially of the drum, the sections in each drum being made up alternately of long and short fingers, certain of said fingers of each length on each drum being staggered axially of the drum with respect to the fingers of the same length on the other drum.

6. In a poultry picker, a pair of rotatable juxtaposed drums, each having radially arranged resilient fingers, said drums being inclined from horizontal and with relation to each other, the fingers on each drum being grouped in sections axially of the drum, the sections in each drum being made up alternately of long and short fingers, certain of said fingers of each length on each drum being staggered axially of the drum with respect to the fingers of the same length on the other drum, each drum having short fingers in the section at its end nearest the other drum and long fingers in the section at its opposite end.

EZRA B. MEAD.

REFERENCES CITED

The following references are of record in the file of this patent:

UNITED STATES PATENTS

| Number | Name | Date |
| --- | --- | --- |
| 843,222 | Luther | Feb. 2, 1907 |
| 1,569,167 | Anderson, Sr. | Jan. 12, 1926 |
| 1,854,626 | Riggall, Jr. | Apr. 19, 1932 |
| 1,889,228 | Swanson | Nov. 29, 1932 |
| 2,235,619 | McMahan et al. | Mar. 18, 1941 |
| 2,328,770 | Barker | Sept. 7, 1943 |
| 2,362,371 | Haist | Nov. 7, 1944 |
| 2,422,608 | Albright | June 17, 1947 |

FOREIGN PATENTS

| Number | Country | Date |
| --- | --- | --- |
| 40,253 | Denmark | May 25, 1929 |